C. BURNETT.
FRUIT JAR.
APPLICATION FILED MAR. 2, 1914.
1,165,314.
Patented Dec. 21, 1915.
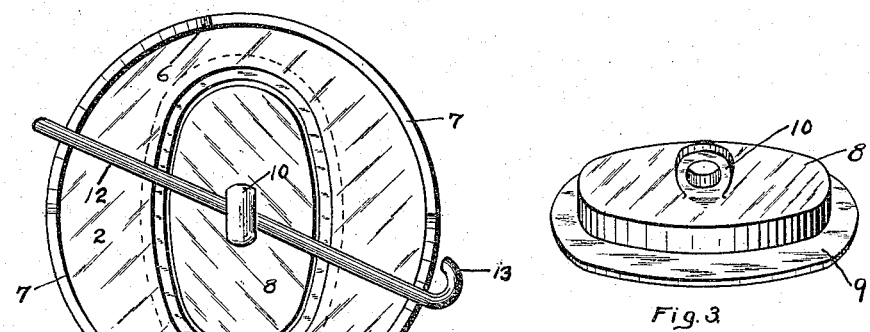
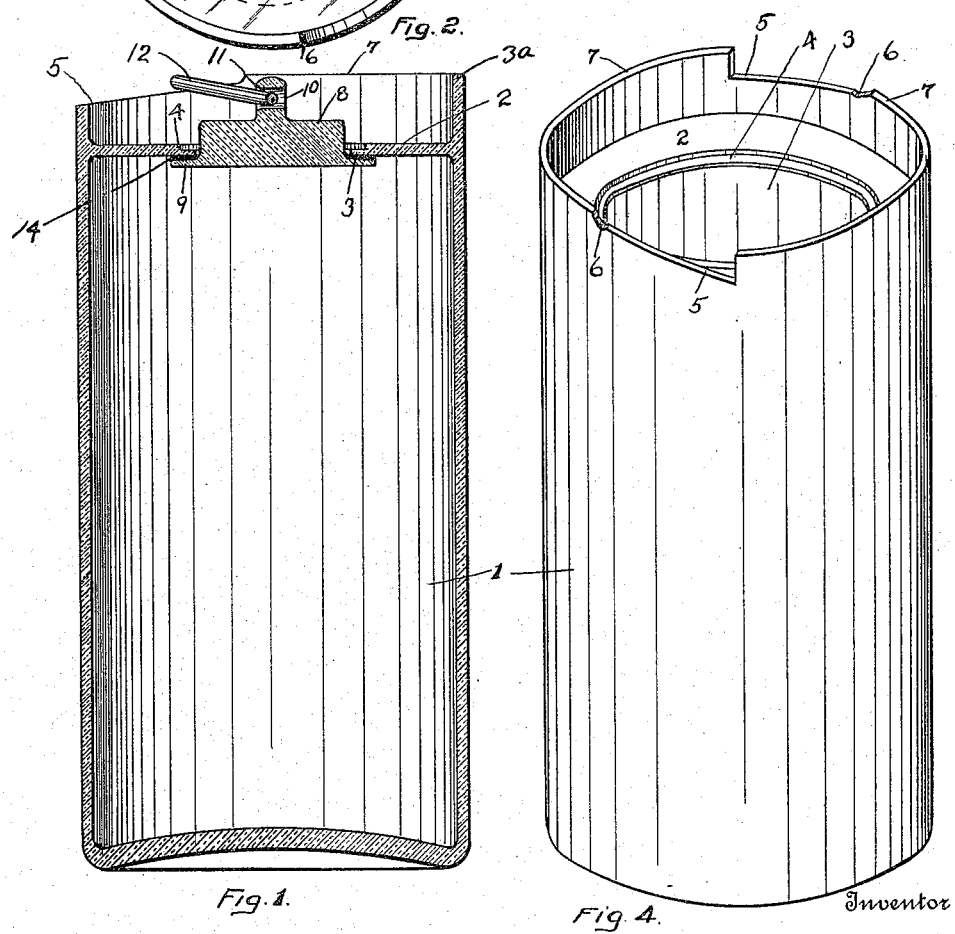
Inventor
CHARLEY BURNETT.

UNITED STATES PATENT OFFICE.

CHARLEY BURNETT, OF WASHINGTON COURT-HOUSE, OHIO.

FRUIT-JAR.

1,165,314.   Specification of Letters Patent.   Patented Dec. 21, 1915.

Application filed March 2, 1914. Serial No. 821,847.

*To all whom it may concern:*

Be it known that I, CHARLEY BURNETT, a citizen of the United States, residing at Washington Court-House, in the county of Fayette and State of Ohio, have invented certain new and useful Improvements in Fruit-Jars, of which the following is a specification.

My invention relates to fruit jars and aims particularly to provide a novel type of sealing means for such fruit jars, which may be readily locked in position and which may be equally readily opened.

My invention resides essentially in the provision of a structure wherein the sealing cap is adapted to be placed within the interior of the fruit jar and subsequently drawn up and to tight engagement with the upper wall of the jar. To effect this, I have found it essential to provide the upper wall of the hollow jar with an oblong opening and an oblong cap, the cap being placed within the jar by so positioning it that its short dimension is passed through the opening in the direction of its longer dimension, and subsequently turned to assume its correct position.

Another object of my invention is to provide a novel securing means for holding the cap in position, these securing means preferably taking the form of inclined camways adapted to coöperate with a securing rod and so located and arranged that the jar may be made to stand in inverted position without interference from the securing rod.

Other objects of my invention will become more apparent from a detailed description of the accompanying drawings, in which similar characters of reference designate corresponding parts, and in which:

Figure 1 is a vertical central section of my improved fruit jar with the cap secured in position, Fig. 2 is a plan view of the structure shown in Fig. 1, Fig. 3 is a view in perspective of the securing cap used by me, and, Fig. 4 is a view in perspective of my fruit jar with the cap removed.

In the drawing, there is shown a fruit jar having a hollow cylindrical body 1, having an inwardly extending ledge 2 around its upper portion. This ledge is so formed to provide an oblong opening 3 and also a countersunk portion 4 around the edge of this opening. The side walls of the body are continued upwardly as is shown at 3ª and so formed that oppositely disposed inclined camways 5 are provided having slightly depressed ends, as is shown at 6. The remainder of the upper edge of the continuation 3ª of the side wall, is formed to present a flat bearing surface such as is shown at 7, to permit the jar standing in its inverted position. The oblong opening 3 of the upper portion of the jar is sealed by means of the cap shown in Fig. 3, wherein 8 represents a central enlarged portion so formed to be concentric with the opening 3 and carrying an outwardly extending flange 9 at its lower end. The dimensions of the lower portion of the cap including the flange 9 are such that the cap will entirely cover the opening when inserted within the jar in the manner shown in Fig. 1. The upper portion of the cap is also provided with the pierced ear such as is shown at 10, this ear being preferably centrally located upon the portion 8 and having the edges of the pierced portion slightly rounded as at 11, to permit a somewhat free movement of the attaching rod 12. It will be noted that this attaching rod is somewhat less in diameter than the diameter of the opening in the ear and further, that it carries a hook portion 13 at one of its ends. This hook portion is adapted to engage the pierced ear 10 for convenience both in removing and in placing the cap in its position. The opposite ends of the rods are then adapted to engage the inclined camways and a slight oscillation will, therefore, tighten the cap in its position, in a manner that must be apparent. The construction determined upon is preferably provided with the cutout portions 6 to give a somewhat supplemental locking action to maintain the rod in its locking position. However, the thickness of the washer 14 may be used as insuring the proper positioning of the rod 12, as well as perfectly sealing the opening. If it is desired to further guard against possible contact with the atmosphere of the contents within the jar, some supplemental sealing means such as sealing wax or melted paraffin may be allowed to flow in the contersunk portion 4.

From the above description, it must be apparent that I have provided a comparatively simple type of fruit jar and one that will fulfil all the requirements of securely sealing the contents contained within it.

The prime advantage attained by my invention resides in the outwardly extending flange of the cap 8 engaging the underside of the inwardly flaring ledge 2, thereby causing a sealing of the jar from within its interior. The peculiar oblong construction permits the placing of the cap in the inside of the jar as has been previously related, while the hooked portion 13 of the rod 12 forms a means for preventing the cap from dropping upon the contents of the jar or to its bottom after the locking means have been released.

What I claim, is:

1. A fruit jar comprising a hollow body, an inwardly extending ledge around the upper portion of said body, said ledge forming an opening in the top of said body, a cap provided with a central enlarged portion concentric with said opening and with an outwardly extending flange of greater size than said opening, a pierced ear on said cap, an upwardly extending flange carried by the upper portion of said body, oppositely disposed portions of said last named flange being cut away to form inclined camways, the remainder being flat, and a rod passing through said ear and engaging said camways, said camways being so formed to permit inverted standing of the jar on said flat portion without interference from said rod.

2. A fruit jar comprising a hollow body, an inwardly extending ledge around the upper portion of said body, said ledge forming an oblong opening in the top of said body, an oblong cap provided with a central enlarged portion concentric with said oblong opening and with an outwardly extending flange of greater size than said opening, said ledge being provided with a countersunk portion surrounding said opening, a pierced ear on said cap, an upwardly extending flange carried by the upper portion of said body, oppositely disposed portions of said last named flange being cut away to form inclined camways, the remainder being flat, and a rod passing through said ear and engaging said camways, said camways being so formed to permit inverted standing of the jar on said flat portions without interference from said rod.

In testimony whereof I affix my signature in presence of two witnesses.

CHARLEY BURNETT.

Witnesses:
WALTER E. L. BOCK,
HARRY D. COFFMAN.